United States Patent [19]
Daudel et al.

[11] Patent Number: 6,020,652
[45] Date of Patent: Feb. 1, 2000

[54] PROCESS FOR REGULATING THE BRAKING POWER OF A SUPERCHARGED INTERNAL COMBUSTION ENGINE

[75] Inventors: Helmut Daudel, Schorndorf; Peter Renninger; Siegfried Sumser, both of Stuttgart, all of Germany

[73] Assignee: DaimlerChrysler AG, Stuttgart, Germany

[21] Appl. No.: 09/161,473

[22] Filed: Sep. 28, 1998

[30] Foreign Application Priority Data

Sep. 26, 1997 [DE] Germany ............... 197 42 445

[51] Int. Cl.$^7$ .................. B60L 11/02; B61C 9/38
[52] U.S. Cl. .................. 290/45; 180/65.2
[58] Field of Search .................. 290/9, 17, 40 R, 290/40 A, 40 C, 45; 322/14; 180/170, 65.2, 338

[56] References Cited

U.S. PATENT DOCUMENTS

| | | | |
|---|---|---|---|
| 4,319,140 | 3/1982 | Paschke | 290/45 |
| 4,473,753 | 9/1984 | Izumi et al. | 290/45 |
| 4,547,678 | 10/1985 | Metzner et al. | 290/40 C |
| 5,079,921 | 1/1992 | McCandless et al. | 60/602 |
| 5,327,992 | 7/1994 | Boll | 180/65.2 |
| 5,409,302 | 4/1995 | Chabbert | 303/112 |
| 5,549,371 | 8/1996 | Konaga et al. | 303/152 |
| 5,853,229 | 12/1998 | Willmann et al. | 303/3 |
| 5,903,061 | 5/1999 | Tsuzuki et al. | 290/40 C |

FOREIGN PATENT DOCUMENTS

| | | |
|---|---|---|
| 43 30 487 | 1/1995 | Germany . |
| 196 16 971 | 10/1997 | Germany . |
| WO 97/45633 | 12/1997 | WIPO . |

*Primary Examiner*—N. Ponomarenko
*Attorney, Agent, or Firm*—Evenson, McKeown, Edwards & Lenahan, PLLC

[57] ABSTRACT

In the engine braking operation of supercharged internal combustion engines, the braking power is generated by backing-up the exhaust gas before it enters an exhaust gas turbine of an exhaust gas turbocharger from an actuator in the exhaust gas duct. In order to make it possible to control the braking power within the operating limits of the exhaust gas turbocharger, the actual value and a maximum value of the turbine inlet pressure within the operating limits of the exhaust gas turbo supercharger are inferred from a performance graph of the internal combustion engine, which performance graph includes an electronically stored compressor performance graph of the supercharged air compressor which represents the relationship between mass throughput and total pressure ratio of the compressor and in which a plurality of engine operating lines for certain actuator positions and certain engine speeds as well as for a constant turbine inlet pressure are recorded. The maximum value arises as a function of the engine speed from a characteristic rotational speed line stored in the performance graph. Corresponding to the desired braking power, a nominal value which, together with the actual value of the turbine inlet pressure, serves in the control circuit as an inlet parameter for an engine controller for a comparison of nominal and actual values, is determined proportionally from the maximum value.

14 Claims, 1 Drawing Sheet

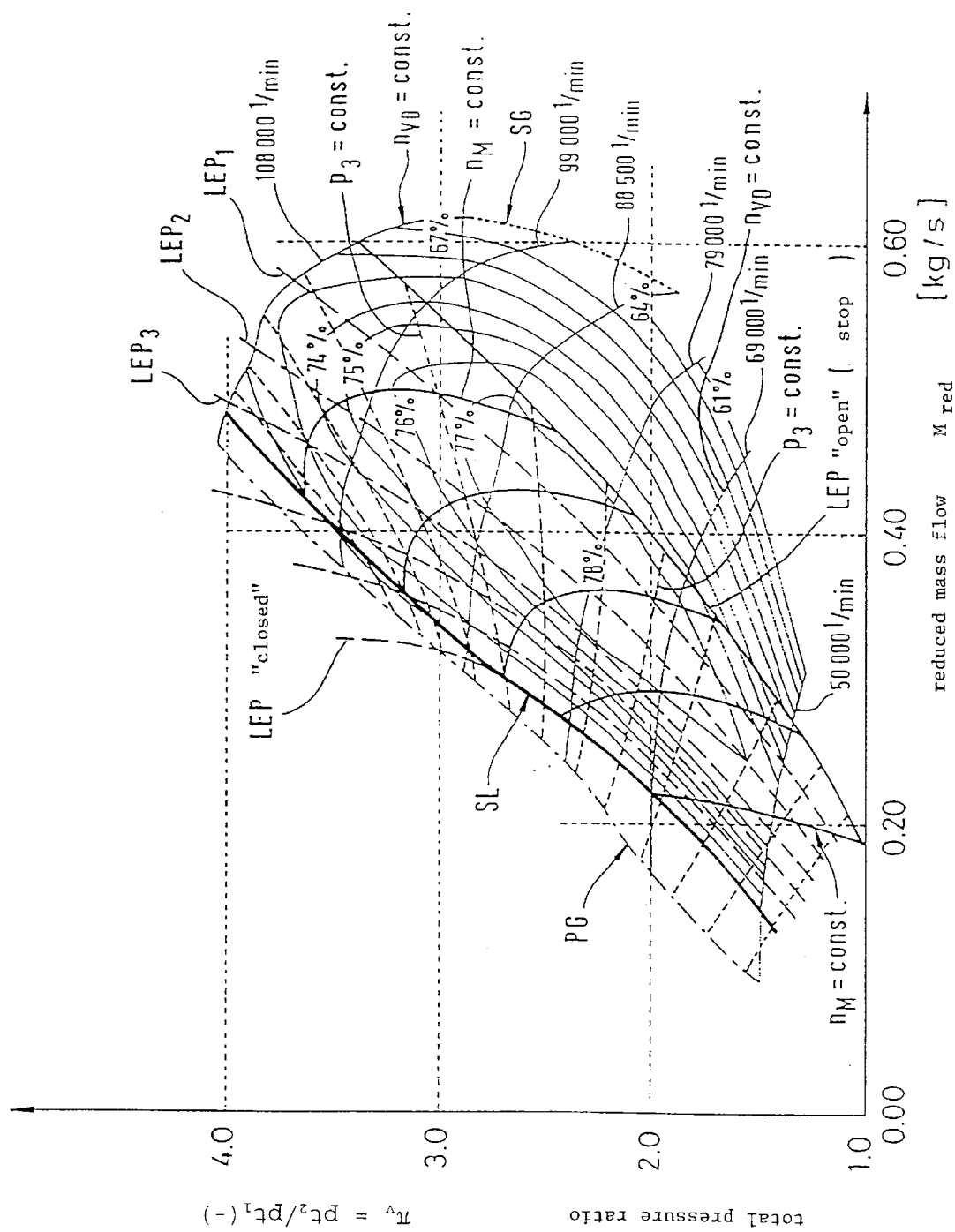

PROCESS FOR REGULATING THE BRAKING POWER OF A SUPERCHARGED INTERNAL COMBUSTION ENGINE

BACKGROUND AND SUMMARY OF THE INVENTION

This application claims the priority of German Application No. 197 42 445.7, filed Sep. 26, 1997, the disclosure of which is expressly incorporated by reference herein.

The invention relates to a process for regulating or controlling the braking power in the engine braking operation of a supercharged internal combustion engine.

The engine braking power is composed of the traction power and the braking power, which is brought about by throttling the exhaust gas flow of the internal combustion engine. With increasing back pressure in the exhaust gas duct of the internal combustion engine, there is an increase in the cyclic gas work of the pistons, which must be produced, in order to push out the exhaust gases against the back pressure. Over and above the traction power, the engine braking power is increased by additional structural expenditures in that an actuator is disposed in the exhaust gas duct of the internal combustion engine and backs up the exhaust gas stream as a function of its adjusted position, that is, as a function of the remaining cross section of the passage.

German Patent document DE 195 16 971 A1 discloses a supercharged internal combustion engine, which has a pivotable exhaust gas flap in the exhaust gas duct or pipe. In the braking operation of the engine, the exhaust gas flap is swivelled as a function of the desired braking power and opens a reduced flow cross section for blocking the exhaust gas stream.

Furthermore, German Patent document DE 43 30 487 C1 discloses a supercharged internal combustion engine having an exhaust gas turbocharger. The turbocharger has an exhaust gas turbine with an adjustable turbine geometry, which is used in the braking operation of the engine as a back pressure brake and, by an appropriate rotation of a pivotable guide baffle part of the turbine, reduces the flow of exhaust gas impinging on the rotor disk of the turbine or, aside from split streams, blocks it.

Both known methods control the engine braking power by the position of the respective actuators in the exhaust gas duct, an increase in engine braking power being linked directly to an increase in the back pressure, that is, to the turbine inlet pressure. No provisions are made for controlling the braking power of the engine by a control parameter in a cyclic structure reacting on itself in the sense of a negative feedback.

An increase in the braking power of the engine by raising the back pressure is possible only to a limited extent in the case of supercharged internal combustion engines. In the engine braking operation, the supercharger operating limits are reached rapidly with the high turbine inlet pressure and the corresponding rotational speed of the exhaust gas turbo supercharger. If the turbocharger operating limits are exceeded, increased wear and possibly a destruction of the supercharger air compressor of the exhaust gas turbo supercharger will result.

Since the control of the braking power or a simple control with the adjusted position of the actuator in the exhaust gas duct are inaccurate control parameters, the exhaust gas turbo supercharger must be operated in engine braking operation within its operating limits at a clear distance from them. The attainable and usable braking power therefore is greatly limited.

It is an object of the invention to provide a process for controlling the braking power in the engine braking operation of a supercharged internal combustion engine, which enables the maximum braking power to be attained within the operating limits of the exhaust gas turbo supercharger.

Pursuant to the invention, this objective is accomplished by providing a process for controlling the braking power in the braking operation of a supercharged internal combustion engine, the exhaust gas of which is backed-up by an actuator in the exhaust gas duct before it enters an exhaust gas turbine of an exhaust gas turbine supercharger, whereby the engine has a performance graph, in which nominal parameters for a large number of operating points are stored electronically and used by an engine controller as input parameters for a comparison of nominal and actual values. The performance graph comprises an electronically stored compressor performance graph of the turbocharger air compressor, which represents the relationship between the mass throughput and total pressure relationship for different exhaust gas turbo supercharger rotational speeds. A plurality of operating lines for certain actuator positions and certain engine speeds, as well as for a constant turbine inlet pressure, are filed in the performance graph. A preferred actuator position is inferred from the performance graph and set, in that, as a controlling parameter, the corresponding turbine inlet pressure for different exhaust gas turbo supercharger rotational speeds, compressor mass flows and compressor pressure relationships is taken as a nominal value from the performance graph. The actual value corresponding to the braking power called for is determined proportionally from a maximum value of the turbine inlet pressure within the operating limits of the exhaust gas turbocharger. The maximum value is inferred as a function of the engine speed from a characteristic rotational speed line stored in the performance graph.

An advantage of the inventive control process is seen therein that it is possible to do without rotational speed sensors for detecting the rotational speed of the exhaust gas supercharger, and without pressure sensors for measuring the turbine inlet pressure, the results of the measurement being unreliable because of the extremely high stresses. With the information of the electronically stored performance characteristics of the compressor, the actual inlet pressure of the turbine can be determined precisely from the parameters of mass flow and total pressure relationship at the compressor, optionally with the aid of parameters that are easily measured such as the ambient pressure, the supercharger pressure and supercharger air temperature by the engine controller, as a function of the rpm of the internal combustion engine. The actual value for the nominal value/actual value comparison for controlling engine braking power is determined proportionally from the maximum value of the turbine inlet pressure, which is specified by the steady state characteristics of the rotational speed within the supercharger operating limits. The proportionally determined actual value cannot exceed the maximum value so that the maximum value can be specified close to the supercharger operating limits of, in each case, the existing engine speed. The largest possible back-up effect in the exhaust gas duct and, with that, the maximum braking power is reached, when the steady state characteristics of the rotational speed of the maximum turbine inlet pressure are close to the pump limit of the compressor in the performance graph.

Advantageously, operating lines for the engine braking operation, the fired-up operation and further types of operation of the engine, such as the exhaust gas recycling operation, are recorded in the performance graph. As a result, optimum operating behavior can be attained with little application effort for each type of operation of the engine. Moreover, a braking signal of a braking signal transmitter, such as a brake pedal, can be supplied to the engine controller for indicating the braking operation state of the internal combustion engine. If the braking signal transmitter, in accordance with an advantageous further development of the invention, generates a normalized braking signal as a function of its operating position, and the braking signal is used by the control unit for determining the actual value as a corresponding proportion of the maximum value, then the braking power can be requested continuously variably directly over the adjustment of the brake signal transmitter while the supercharger operating limits basically are observed.

Other objects, advantages and novel features of the present invention will become apparent from the following detailed description of the invention when considered in conjunction with the accompanying drawing.

BRIEF DESCRIPTION OF THE DRAWING

The FIGURE is a graphical illustration of the total pressure ratio versus the reduced mass flow according to the invention.

DETAILED DESCRIPTION OF THE DRAWING

By way of explanation, the construction of an internal combustion engine, which is not shown, is initially described. During the engine braking operation of this internal combustion engine, the braking power is controlled with the inventive method. An exhaust gas turbo supercharger of the internal combustion engine has a supercharger air compressor and an exhaust gas turbine, which is connected with the compressor so that there can be no mutual rotation. The exhaust gas turbine, which is driven by the exhaust gas flowing from the internal combustion engine, is equipped with a variably adjustable turbine geometry. Depending on its position LEP, the guide baffle of the exhaust gas turbine backs up the exhaust gas of the internal combustion engine before the exhaust gas enters the turbine. The internal combustion engine has a performance graph, which is described in greater detail below and in which the nominal parameters, which are used as input parameters of an engine controller for comparing the actual with the nominal value and belong to a large number of operating points, can be stored electronically.

A portion of the performance graph, which comprises the compressor performance graph of the supercharger air compressor VD, is shown in the Figure. The reduced (normalized) mass flow $M_{red}$ of the supercharger air compressor is plotted on the abscissa and determined with the following equation:

$$M_{red} = M(Tt_1/T_{bez})^{1/2}/pt_1/p_{bez} \quad \text{(kg/s)}$$

in which the parameter symbols have the following meanings: M=mass flow (kg/s); and $Tt_1$, $pt_1$=temperature or pressure at the compressor inlet; $T_{bez}$, $p_{bez}$=reference temperature and reference pressure (for example, 293° K and 991 mbar). The total pressure ratio $\Pi_V = pt_2/pt_1$ is shown on the ordinate, $pt_2$ being the outlet pressure of the compressor and $pt_1$ the inlet pressure of the compressor. For ascertaining the reduced flow $M_{red}$, the inlet parameters of $pt_1$, $pt_2$ and $Tt_1$ can be determined for the engine controller with measurement sensors, appropriately disposed at the compressor with little structural expenditure being involved.

The compressor performance graph shown in the FIGURE represents the relationship between the mass throughput $M_{red}$ and the total pressure ratio n for different rotational speeds of the compressor $n_{VD}$, that is, the rotational speed of the turbocharger (for example, values for $n_{VD}$ of 50,000 per minute to 108,000 per minute) and, moreover, for different compressor efficiencies. The lines of equal efficiency extend shell-like about the maximum efficiency in the center of the performance graph for the compressor; the lines of equal compressor rotational speed are shown as curves decreasing flat from the top left to the bottom right.

Moreover, a large number of engine operating lines for certain guide baffle positions LEP ($LEP_1$ to $LEP_3$) of the exhaust gas turbine and certain engine speeds $n_M$ for the engine braking operation as well as engine operating lines for constant turbine inlet pressure $p_3$ are recorded in the performance graph, so that an associated turbine inlet pressure $p_3$ can be taken from the performance graph for different turbocharger speeds $n_{VD}$, compressor mass flow $M_{red}$ and total pressure relationships $\Pi_V$.

In an analogous manner, further parts of the performance graph, which are not shown, comprise the compressor performance graph and a net of engine operating lines for constant baffle guide positions of the exhaust gas turbine and constant engine speeds for other types of operation of the engine, such as the fired-up operation with different operating loads or also the exhaust gas recycling operation. Depending on the construction and the operating possibilities of the engine braking system, performance graphs for the engine braking operation with a constant throttle, that is, permanently open decompression valves, time engine braking valves or also, for a strictly traction operation with closed braking valves in the cylinders of the internal combustion engine or for the use of an exhaust gas flap, can be stored electronically. Aside from a variable and effective turbo braking operation, equipping the exhaust gas turbine of the exhaust gas turbo supercharger with a variable turbine geometry offers advantages in the fired-up operation. However, in order to achieve a controllable braking power pursuant to the inventive method, axial slide valves, adjustable walls, nozzles or brake flaps or similar actuators for backing-up the exhaust gas before it enters the exhaust gas turbine, can be provided alternatively to the guide baffle with adjustable guide blades.

The compressor performance graph is limited at the left by the pump limitation PG and, at the right, by the stuffing limit SG of the compressor. The pump limit PG arises from the burbling at the compressor blades which, upon a further decrease in the reduced mass flow Mred, leads to an unstable inlet flow. Pumping should be avoided, since blade vibrations arise, which could cause damage. At the stuffing limit SG, the velocity of sound is reached in the flow cross section of the compressor, as a result of which a further increase in the inlet mass flow at a given total pressure ratio $\Pi_V$ is physically prevented. The upper boundary of the compressor performance graph is determined by the maximum permissible compressor speed $n_{VD}$, which depends on the geometry of the compressor rotor disk (rotational bursting speed, depending on the diameter and the materials of construction).

By electronically coupling the compressor performance graph with the net of engine operating lines for constant guide baffle positions LEP and engine speeds $n_M$ for different mass throughputs $M_{red}$, a preferred guide baffle position LEP of the guide baffle of the exhaust gas turbine for the engine braking operation and optionally also for fired-up engine operation or other types of engine operation existing, can be inferred from the performance graph as a function of the engine speed $n_M$ and set at the guide baffle of the exhaust gas turbine.

After the mass flow $M_{red}$ and the total pressure ratio $\pi_v$ at the compressor are determined as a function of the respective engine speed, the turbine inlet pressure $p_3$ can be inferred from the compressor performance graph. Likewise, the rotational speed of the turbocharger, which is difficult to measure because of the high values, can be inferred precisely from the performance graph information.

If engine braking power is called for and a braking signal transmitter, such as a brake pedal or brake lever, is activated, the brake signal transmitter generates a brake signal, which is supplied to the engine controller for indicating a braking operation state of the internal combustion engine. The engine controller infers from the compressor performance graph with engine brake operating lines the actual value of the turbine inlet pressure and, furthermore, a maximum value of the turbine inlet pressure within the operating limits of the exhaust gas turbo supercharger at the established engine speed. The maximum value is inferred from the characteristic rotational speed line SL, which extends in the performance graph close to but at a slight safety distance away from the pump limit PG. The brake signal transmitter produces a normalized brake signal as a function of its operating position. This brake signal is used by the engine controller for the infinitely variable determination of the nominal value of the turbine inlet pressure as corresponding portion of the maximum value. When a maximum braking power of 100% is called for, the nominal value corresponds to the maximum permissible turbine inlet pressure, with which the largest possible braking power can be attained in the engine braking operation. The braking signal can be varied by the flow strength, the pulsation strength and pulsation frequency, or by a similar parameter.

It is thus possible to act directly, over the operating position of the brake signal transmitter, on the braking power which, as already described, is controlled by the proportional determination of the nominal value from the maximum value and the subsequent comparison of actual and nominal values in the engine regulator. When it is necessary to utilize the maximum possible braking power, exceeding the turbocharger operating limit in the engine braking operation of the supercharged internal combustion engine is reliably avoided. The characteristic rotational speed line SL is stored in the performance graph as the maximum operating line of the internal combustion engine close to the pump limit PG and lies within the usable area of the compressor performance graph, which is determined by the limiting positions of the blades of the guide baffle of the turbine (LEP "open", LEP "closed"). In the lower pressure relationship region of the compressor, the characteristic rotational speed line SL lies on the operating line of the exhaust gas turbo supercharger with a closed guide baffle position. In the diagram shown in the drawing, it can be seen that, when the turbine guide baffle is closed or almost closed, theoretical operating lines lie in the compressor performance graph to the left of the pump limit PG. Therefore, when the characteristic rotational speed line SL is theoretically exceeded in the operation of the turbocharger air compressor, the turbine guide baffle is opened as the engine speed $n_M$ increases. Accordingly, only operating points within the compressor performance graph are approached in engine operation and the correctness of the possible maximum values of the turbine entry pressure is ensured in the engine braking operation.

When there is a braking signal, the engine controller triggers an engine braking device with brake valves in the cylinders and controls the braking power over adjusting measures in the exhaust gas duct, which have a backing-up effect. The engine operating lines are generated from engine measurements in braking trials. Moreover, operating lines for different types of operation of the engine brake can be determined and stored in the performance graph, such as constant throttling, that is, decompression valve in the cylinder constantly open, timed engine braking valve, or closed engine braking valve (strictly traction operation).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for regulating braking power in a braking operation of a supercharged internal combustion engine, an exhaust gas of which is backed-up by an actuator in an exhaust gas duct before entering an exhaust gas turbine of an exhaust gas turbine supercharger, the process comprising the acts of:

electronically storing a compressor performance graph of an air compressor of the turbine supercharger representing a relationship between a mass throughput and total pressure ratio for different exhaust gas turbo supercharger rotational speeds, said performance graph having nominal parameters for a large number of operating points and being used by an engine controller as input parameters for a comparison of nominal and actual values, wherein a plurality of operating lines for certain actuator positions and certain engine speeds, as well as for a constant turbine inlet pressure, are contained in the performance graph;

determining and setting a preferred actuator position from the performance graph by taking as a controlling parameter a corresponding turbine inlet pressure for different exhaust gas turbo supercharger rotational speeds, compressor mass flows, and compressor pressure ratios as a nominal value from the performance graph;

proportionally determining an actual value corresponding to the desired braking power from a maximum value of the turbine inlet pressure within operating limits of the exhaust gas turbocharger, said maximum value being inferred as a function of the engine speed from a characteristic rotational speed line stored in the performance graph.

2. The process according to claim 1, wherein the characteristic rotational speed line extends near a pump limit of the compressor in the performance graph.

3. The process according to claim 1, further comprising the act of recording engine operating lines for engine braking operation and fired-up operation in the performance graph.

4. The process according to claim 2, further comprising the act of recording engine operating lines for engine braking operation and fired-up operation in the performance graph.

5. The process according to claim 3, further comprising the act of supplying a braking signal of a braking signal transmitter to the engine controller to indicate a braking operation state of the internal combustion engine.

6. The process according to claim 4, further comprising the act of supplying a braking signal of a braking signal transmitter to the engine controller to indicate a braking operation state of the internal combustion engine.

7. The process according to claim 1, further comprising the act of triggering an additional engine braking device via the engine controller in the engine braking state.

8. The process according to claim 7, wherein the additional engine braking device comprises braking valves in a cylinder of the internal combustion engine.

9. The process according to claim 5, further comprising the act of generating a normalized braking signal via a braking signal transmitter as a function of an operating position of the braking signal transmitter; and using the normalized braking signal by the engine controller for an infinitely variable determination of the actual value of the turbine inlet pressure as a corresponding portion of the maximum value.

10. The process according to claim 6, further comprising the act of generating a normalized braking signal via a braking signal transmitter as a function of an operating position of the braking signal transmitter; and using the normalized braking signal by the engine controller for an infinitely variable determination of the actual value of the turbine inlet pressure as a corresponding portion of the maximum value.

11. The process according to claim 7, further comprising the act of generating a normalized braking signal via a braking signal transmitter as a function of an operating position of the braking signal transmitter; and using the normalized braking signal by the engine controller for an infinitely variable determination of the actual value of the turbine inlet pressure as a corresponding portion of the maximum value.

12. The process according to claim 8, further comprising the act of generating a normalized braking signal via a braking signal transmitter as a function of an operating position of the braking signal transmitter; and using the normalized braking signal by the engine controller for an infinitely variable determination of the actual value of the turbine inlet pressure as a corresponding portion of the maximum value.

13. The process according to claim 1, further comprising the act controlling the engine braking power via a guide baffle position of a variable turbine geometry of the exhaust gas turbine.

14. A software product for regulating braking power in a braking operation of a supercharged internal combustion engine, an exhaust gas of which is backed-up by an actuator in an exhaust gas duct before entering an exhaust gas turbine of a supercharger, comprising:

a computer readable medium having stored thereon program code segments that:

determine and set a preferred actuator position from a compressor performance graph electronically stored in a memory by taking as a controlling parameter a corresponding turbine inlet pressure value for different exhaust gas turbo supercharger rotational speeds, compressor mass flows, and compressor pressure ratios as a nominal value from the performance graph, said performance graph representing a relationship between a mass throughput and total pressure ratio for different rotational speeds, wherein a plurality of operating lines for certain actuator positions and certain engine speeds, as well as for a constant turbine inlet pressure, are contained in the performance graph;

proportionally determine an actual value corresponding to the desired braking power from a maximum value of the turbine inlet pressure within operating limits of the exhaust gas turbocharger, said maximum value being inferred as a function of the engine speed from a characteristic rotational speed line stored in the performance graph.

* * * * *